United States Patent [19]

Corcoran

[11] Patent Number: 5,240,294
[45] Date of Patent: Aug. 31, 1993

[54] PIPE COUPLING CLAMP WITH BOLT PADS AND LINEAR EXTENDING LUGS

[75] Inventor: Daniel P. Corcoran, Grandville, Mich.

[73] Assignee: Corcoran Industries, Inc., Grandville, Mich.

[21] Appl. No.: 753,450

[22] Filed: Aug. 30, 1991

[51] Int. Cl.⁵ .............................................. F16L 17/00
[52] U.S. Cl. .................................... 285/373; 285/419; 285/424
[58] Field of Search ............... 285/373, 419, 424, 112

[56] References Cited

U.S. PATENT DOCUMENTS

| | | |
|---|---|---|
| 1,255,417 | 2/1918 | Hedges ................................. 285/419 |
| 1,293,871 | 2/1919 | Murray . |
| 1,357,894 | 11/1920 | Pearsall .............................. 285/373 |
| 3,239,254 | 3/1966 | Campbell ........................ 285/419 X |
| 3,756,629 | 9/1973 | Gibb . |
| 3,982,779 | 9/1976 | Hickey ........................... 285/373 X |

Primary Examiner—Eric K. Nicholson
Attorney, Agent, or Firm—Robert L. McKellar

[57] ABSTRACT

What is disclosed are novel pipe segments, pipe fittings, and methods of coupling pipe together wherein the novelty resides in the use of fastener means and coupling segments containing lugs with holes therethrough as couplers for the pipe segments whereby the pipe segments have metal deformations near their ends to accomodate the holes of the lugs.

4 Claims, 5 Drawing Sheets

PIPE COUPLING CLAMP WITH BOLT PADS AND LINEAR EXTENDING LUGS

FIELD OF INVENTION

The invention disclosed herein deals with securing devices for piping and pipe fittings for pipeline assemblies wherein the pipelines are employed for conveying fluids under pressure, and methods of securing pipe segments to create a pipeline.

More specifically, this invention deals with novel pipe coupling segments, pipe couplings, novel pipe fittings, methods of securing pipes and pipe fittings, and coupled pipeline systems, for conveying fluids under pressure.

The invention described herein deals with smooth pipe and pipe fittings. That is, this invention deals with pipe and pipe fittings which are not grooved, ridged, or threaded on their surface and this invention deals with pipes and pipe fittings which do not have bell-like configurations on their ends to accomodate threads.

BACKGROUND OF THE INVENTION

Pipeline systems and methods of assembling them have been known for a long time. The prior art is replete with patents directed to the couplings used to assemble such systems and to such methods. The advantages of being able to join various segments of pipe with quick connect coupling devices is obvious when compared to pipelines which are joined by other means such as welding. Thus, the use of segmented mechanical couplings for joining the ends of pipes has attained wide commercial acceptance and the coupling industry has grown steadily over the past few years.

The couplings commonly used today comprise arcuate pairs of coupling segments having keys or other projections which embrace the adjacent ends of a pair of pipes and essentially align with a pre-formed slot, groove, or surface bead on the pipe ends. Typically, these coupling segments have a provision for including a sealing gasket within an internal chamber of the segments which interfaces with the pipe ends and prevents them from leaking. When the coupling segments are bolted together they extend in essentially a continuous ring about the circumference of the pipe ends to form a pipe coupling which attempts to immoblize the pipe ends and eliminate or reduce the width of gaps between the pipe ends. However, differences in the diameter of stock pipe of the same nominal diameter result in a less than optimal immobilization of the pipe ends, or other problems arise which cause the pipe ends to flex from the center axis of the pipe, relative to each other, resulting in leaks and sags in long runs of pipe and other problems. Further, attempts at immobilizing pipe to prevent flex has resulted in pipe couplings which tend to disallow fexibility in expansion and contraction of the pipe, resulting in leaking pipe systems.

It would also be beneficial if the pipes did not have to be pre-formed in an extraordinary way such as slotting, grooving, or beading, and most beneficial if the couplings could be utilized on the surfaces of smooth pipes without a great deal of pre-preparation of the pipe ends. The fact that one does not have to deal with slotting, grooving, threading, or beading pipe, or with threads on pipe fittings such as welded outlets, tees, elbows, crossovers and the like, means that the operation of installing pipelines tends to become inexpensive, both from a materials standpoint and from a manual labor standpoint. Further, if one does not have to deal with welding studs, and or welding the couplings in place, this too provides a cost and time savings.

It would thus be desirable to have an economical coupling, that would save time and money in its installation, while having a coupling that accomplishes immobilization of the ends of the pipes to prevent severe flex problems, while at the same time allowing expansion and contraction of the pipe. It should be understood that "flex" as used in this industry refers to the degree of bending or bending movement that can occur between the pipe members if the pipe line system is put under stress. It would be a further advantage if one did not have to deal with complex coupling arrangements, grooving or beading of pipe ends, threading of elbows and tees and the like and could just join the pipe and its various fittings together with a minimum of effort wherein the couplings, tees, elbows, and the like would not be movable in the circumferential direction about the pipe.

It would be a most decided advantage if the resulting pipeline had essentially unrestricted flow of any material that was being conveyed by the pipeline and the only restriction on flow was the actual inside diameter of the pipeline itself. All of these advantages and more can be obtained with the instant invention.

There is a long list of U.S. Patents dealing with couplings for pipe, wherein various arrangements of grooves and keys, beads and keys, and pegs and slots, are used to couple pipes together, such patents being: U.S. Pat. No. 1,293,871 to Murray, issued Feb. 11, 1919; U.S. Pat. No. 2,752,173 to Kroos; U.S. Pat. No. 3,328,053 to Mattimore et al, issued June 27, 1967; U.S. Pat. No. 3,680,894 to Young, issued Aug. 1, 1972; U.S. Pat. No. 3,695,638 to Blakeley, issued Oct. 3, 1972; U.S. Pat. No. 3,756,629 to Gibb, issued Sept. 4, 1973; U.S. Pat. No. 3,999,785 to Blakeley, issued Dec. 28, 1976, U.S. Pat. No. 4,163,571 to Nash, issued Aug. 7, 1979; U.S. Pat. No. 4,348,041 to Imai, et al, issued Sept. 7, 1982; U.S. Pat. No. 4,471,979 to Gibb, et al, issued Sept. 18, 1984; U.S. Pat. No. 4,522,434 to Webb, issued June 11, 1985; U.S. Pat. No. 4,561,678 to Kunsman, issued Dec. 31, 1985; U.S. Pat. No. 4,601,495 to Webb, issued Jul. 22, 1986; U.S. Pat. No. 4,611,839 to Rung et al, issued Sept. 16, 1986; U.S. Pat. No. Des. 287,532 to Jones et al, issued Dec. 30, 1986; U.S. Pat. No. 4,639,020 to Rung et al, issued Jan. 27, 1987; U.S. Pat. No. 4,643,461 to Thau, Jr. et al, issued Feb. 17, 1987; U.S. Pat. No. 4,702,499 to deRaymond et al, issued Oct. 27, 1987; U.S. Pat. No. 4,702,500 to Thau et al, issued Oct. 27, 1987, and Canada 701,311 to Pflederer et al, the two most pertinent references to the invention disclosed herein being Murray, U.S. Pat. No. 1,293,871 and U.S. Pat. No. 3,756,629 to Gibb.

Murray deals with a method and a coupling for connecting smooth surfaced pipe at the ends of the pipe members. The coupling consists of a tubular sleeve, which is mounted over both ends of the the adjacent pipe ends. The sleeve has perforations or openings through the sleeve circumferentially around the sleeve. A metal rod is then inserted in each opening and an electrical current sufficient for welding is passed through the metal rod to weld the sleeve to the pipe, while depositing a welded projection on the pipe and through the opening with the comcomitant result that the sleeve is essentially welded to the pipe.

Gibb deals with a stud system of joining pipe using couplings that have been designed as an indented bridge to overlay the studs. Studs are first welded in a circumferential configuration on the outer surface of the edge of the pipe members and the indented bridge coupling is laid over the welded studs. In those cases when the bolts, or fastening means for the couplings are drawn together, the bridge draws down on the studs whereby the studs, residing in the indentions of the bridge, hold the pipe ends together. Gibb also discloses the use of a bridge in FIG. 14, which utilizes slots through which the welded studs are projected, said studs being threaded on their upper ends to receive threaded nuts in order to secure the bridge in place.

THE INVENTION

The devices of the present invention overcome the prior art problem of costly installation.

The devices of the instant invention allow for inexpensive installation of pipelines while at the same time maintaining the integrity of the pipeline system. A further advantage is that the devices of the instant invention will not rotate circumferentially about the pipe once they are installed. A further advantage is that the couplings of this invention allow predetermined gaps or openings between the pipe ends so that the pipeline can expand and contract, yet the connected pipes are essentially immobilized.

Yet another advantage of the instant invention devices is that they will safely lock pipe systems together without projecting anything into the interior of the pipe that substantially inhibits the flow of any fluid conveyed by the pipeline to give a "free flow" pipeline system. This is true because of the unique configuration of the devices and their adaptive points on the pipeline.

Thus, these significant advantages are provided by uniquely designed couplings and other pipe fittings, their use in a method and the pipeline systems that result from such methods which shall be described infra.

With specificity, this invention comprises, in part, a pipe coupling segment for use in joining pipe, said coupling segment comprising an arcuate body comprised of radial and axial walls providing a receptacle for a sealing means wherein each radial wall has an interior surface and an exterior surface and each radial wall of each said arcuate body being radially inwardly extending from the axial wall to provide a support for a projecting lug which is intended for engagement with a metal deformation in the ends of pipe members, said pipe members having a linear axis, said pipe members being arranged in juxtaposed relationship to each other. The arcuate body terminates in bolt pads at both ends, said bolt pads being used as a means, in combination with a fastening means, for securing said coupling segment with another like coupling segment in an end-to-end encircling relationship about said pipe.

Each said radial wall has integrally positioned on its center exterior surface, a lug, each said lug having a lower surface and an upper surface, said lower surface being essentially a continuation of a portion of the radial wall side projecting along the linear axis of the pipe members, conforming configuration with said side; each said lug having slots therethrough which are vertical to said lower surface and the slots are configured to receive metal deformations situated on the respective ends of the pipe members, whereby, as the fastening means of said arcuate bodies are secured and tightened on the bolt pads, the lugs are seated around the metal projections to cause a drawing down of the coupling segment on the metal deformations to cause the pipe members to be held together.

Also forming part of this invention are pipe couplings for joining pipe, said pipe couplings including two arcuate coupling segments and a fastening means, each said coupling segment comprising an arcuate body comprised of radial and axial walls providing a receptacle for a sealing means wherein each radial wall has an interior surface and an exterior surface and each radial wall of each said arcuate body being radially inwardly extending from the axial wall to provide a support for a projecting lug which is intended for engagement with a metal deformation in the ends of pipe members, said pipe members having a linear axis, said pipe members being arranged in juxtaposed relationship to each other. The arcuate body terminates in bolt pads at both ends, said bolt pads being used as a means, in combination with a fastening means, for securing said coupling segment with another like coupling segment in an end-to-end encircling relationship about said pipe.

Each said radial wall has integrally positioned on its center exterior surface, a lug, each said lug having a lower surface and an upper surface, said lower surface being essentially a continuation of a portion of the radial wall side projecting along the linear axis of the pipe members, said lower surface being aligned in essentially a pipe conforming configuration with said side; each said lug having slots therethrough which are vertical to said lower surface and the slots are configured to receive metal deformations situated on the respective ends of the pipe members, whereby, as the fastening means of said arcuate bodies are secured and tightened on the bolt pads, the lugs are seated around the metal projections to cause a drawing down of the coupling segment on the metal deformations to cause the pipe members to be held together.

A further aspect of this invention is a method of coupling smooth pipe segments at their ends, the method comprising (I) forming a metal deformation on the outside surface of each pipe segment, a predetermined distance from each pipe end to obtain prepared pipe ends; (II) axially aligning the prepared pipe ends with each other; (III) applying a coupling and a fastening means of this invention to the pipe at the prepared pipe ends; (IV) tightening the fastening means, whereby at least one coupling segment is drawn down onto the metal deformations to cause the pipe members to be held together.

Yet another aspect of this invention is another method of coupling smooth pipe segments at their ends, the method relying on pre-prepared pipe segments, the method comprising (I) axially aligning the prepared pipe ends with each other; (II) applying a coupling and a fastening means of this invention to the pipe at the prepared pipe ends; (III) tightening the fastening means, whereby at least one coupling segment is drawn down onto the metal deformations to cause the pipe members to be held together.

Still further, this invention comprises smooth pipe and pipe fittings wherein the pipe and pipe fittings have at least one metal deformation at each end of the pipe or pipe fitting to accomodate the coupling segments of this invention.

Finally, this invention comprises a system of piping wherein the pipes and pipe fittings are coupled by the couplings of this invention.

DETAILED DESCRIPTION OF THE INVENTION

Figure 1:
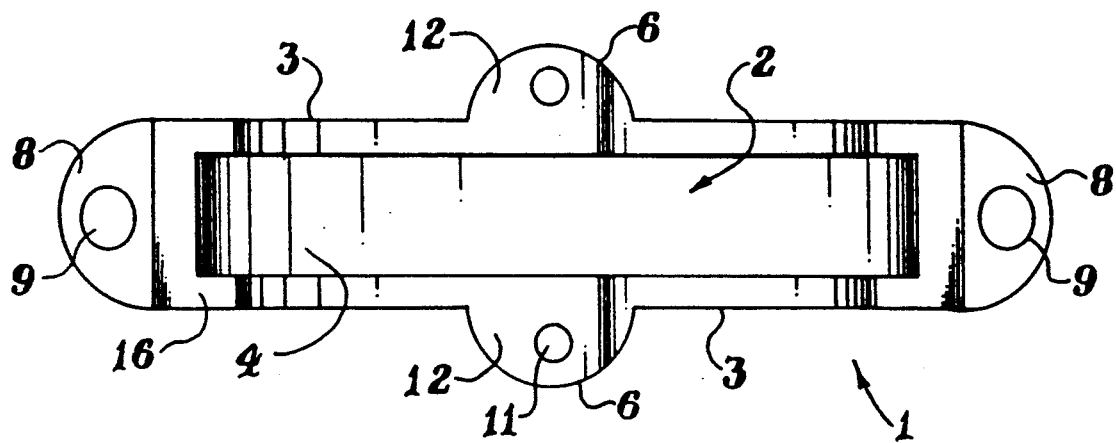
FIG. 1 is a an interior and bottom view of a coupling segment of this invention.
Figure 2:
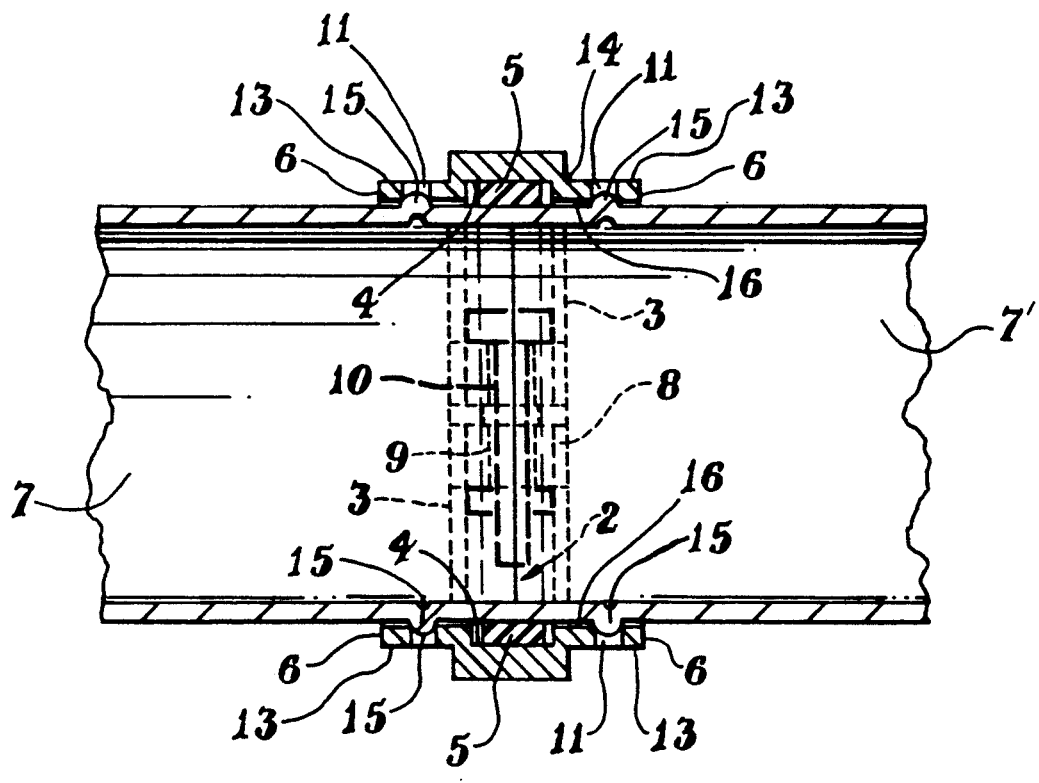
FIG. 2 is a side view of a coupling segment and two juxtapositioned, end to end pipe members.

With regard to FIG. 1 and FIG. 2, there is shown in FIG. 1 an interior and bottom view of a coupling segment 1 of this invention wherein there is shown an arcuate sealing groove or channel member 2 comprised of radial walls 3 and an axial wall 4, for the reception of a sealing gasket 5 (pictured in FIG. 2). It should be noted by those skilled in the art that the inventive coupling segment of this invention does not have axial projections beyond the radial walls except for the lugs 6. The gasket 5 spans the adjacent ends of pipes 7 and 7' (shown in FIG. 2) and is held in place by the coupling segment 1 in conjunction with another like coupling segment 1' as illustrated in FIG. 3 This gasket 5 seals against the pipe ends and prevents leakage therefrom.

The gasket 5 may be of any required cross-section, and may be either a circumferentially continuous gasket, a split gasket, or, plural gasket segments which are respectively secured within and carried by the coupling segments 1.

Figure 3:
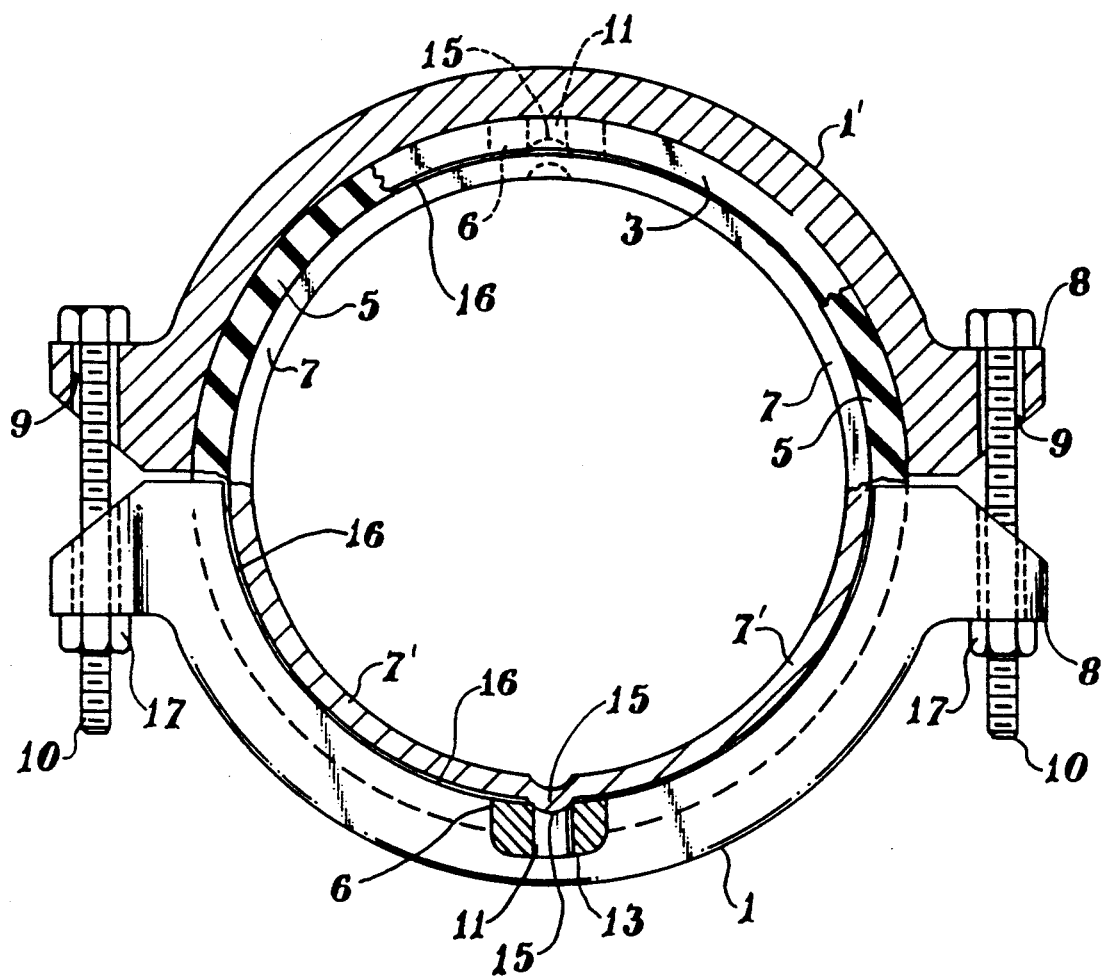
FIG. 3 is a front elevation and a partial cross section of a pipe coupling of the present invention, showing the interrelationship of the coupling segments to form a coupling of this invention, and the arrangement of a gasket therewithin.

Each coupling segment 1 has a bolt pad 8 at each end of the coupling and each bolt pad 8 has a hole 9 therethrough for the insertion of a fastening means 10 for the coupling segments 1, such as a bolt, as shown in FIG. 3.

Each coupling segment 1, has in addition to the bolt pads 8 at each of its ends, at least one integral lug 6 per radial wall 3, of the coupling segment 1. Each lug has a lower surface 12 and an upper surface 13, said lower surface 12 being essentially a continuation of a portion of the radial wall 3 from its exterior side 14, said lower surface 12 contacting respectively one of said pipe members 7 at a metal deformation 15. Said lower surface 12 is aligned in essentially a pipe conforming configuration with said exterior side 14, and each lug 6 has slots 11 therethrough which are vertical to the pipe conforming configuration of said lower surface 12. The slots 11 are configured to receive metal deformations 15 situated on the respective ends of pipe members 7 so that the lugs 6 will seat down on the metal deformations 15, yet allow a small amount of movement of the lug 6 about the metal deformation 15. As the fastening means 10 of said coupling segments are secured and tightened on the bolt pads 8, the lugs 6 are seated around the metal deformations 15 to cause a drawing down of the lugs onto the metal deformations 15 to cause pipe members 7 and 7' to be held together, but not so rigidly that there cannot be a small amount of movement about the metal deformation 15. What is meant by "small" for purposes of this invention is that the pipe ends can move a nominal 1/32 to as much as 3/32 to accomodate off sized or irregular pipe members. The particular configuration of the upper surface 13 of the lug 6 is not critical, and is essentially flat to accomodate the head of the fastening means 10. What is meant by "pipe conforming configuration" for purposes of this invention is that the lower surface 12 of the lug 6 could be essentially flat, as long as the bottom edge of the slots 9 contact and fit around the metal deformations 15, however, it is preferred that the lower surface 12 of the lug 6 be slightly curved to conform to the curvature of the outer surface of the pipe that is being coupled by the coupling. It is also critical to this invention that the bottom surfaces 16 of the radial walls 3 do not extend inwardly towards the pipe surface at a distance greater than the lower surface of the lugs 6, and it is most preferred that the bottom surfaces 16 of the radial walls 3 are a lesser distance than the lower surface of the lugs 6 in order that the lugs 6 may seat upon the metal deformations 15 without inference from the bottoming out of the bottom surfaces 16 of the radial walls 3 on the surface of the pipe members 7 and 7'. This allows the lugs 6 and the metal deformations 15 to do the actual contact and coupling of the pipe members 7 and 7', rather than the radial walls 3. In practice, it is possible that the correct seating of the lugs 6 on the metal deformations 15 to hold and stabilize the pipe members 7 and 7' will allow an intimate contact of the surface of the pipe members 7 and 7' with the bottom surfaces 16 of the radial walls 3 without jeopardizing the holding power of the coupling.

With reference to FIG. 3, there is shown a front elevation and a partial cross section of a pipe coupling of the present invention, showing the interrelationship of the coupling segments 1 and 1' to form a coupling of this invention, and the arrangement of the gasket 5 therewithin.

Thus there is shown the coupling segments 1 and 1' in an encircling relationship about a pipe 7 and showing the radial wall 3, lugs 6, slots 11 (in phantom) and the metal deformations 15 within the slots 11. There is further shown the fastening means 10 which is illustrated therein as a bolt having a nut 17 affixed thereto which has been inserted through each vertical hole 9 in bolt pads 8.

In operation, when the bolts 10 are tightened down, the coupling segments 1 and 1' are drawn together, and the lugs 6, with their slots 11 are seated over the metal deformations 15. This not only prevents the coupling segments 1 and 1' from rotating around the circumference of the pipe 7 and 7' and but prevents the pipe members 7 and 7' from separating from each other. Thus, the pipe members cannot be separated, nor can they rotate unless they rotate together.

The metal deformations 15 in the pipe are easily formed by hydraulic tools that can be carried by the workman in the field, or the metal deformations can be placed on the pipe at the manufacturing site. The practice of putting the metal deformations in the pipe prior to use is what is referred to in this specification as being "pre-prepared". "Pre-determined" for purposes of this invention means that the metal deformations are placed on the pipe, near the ends at a pre-determined distance from the end. Whatever the case, the placement of the metal deformations 15 is easy, practical, and thus economical as compared to the costly process of grooving, ridging, or threading pipe and thus this invention is an advance in the art.

Figure 8:
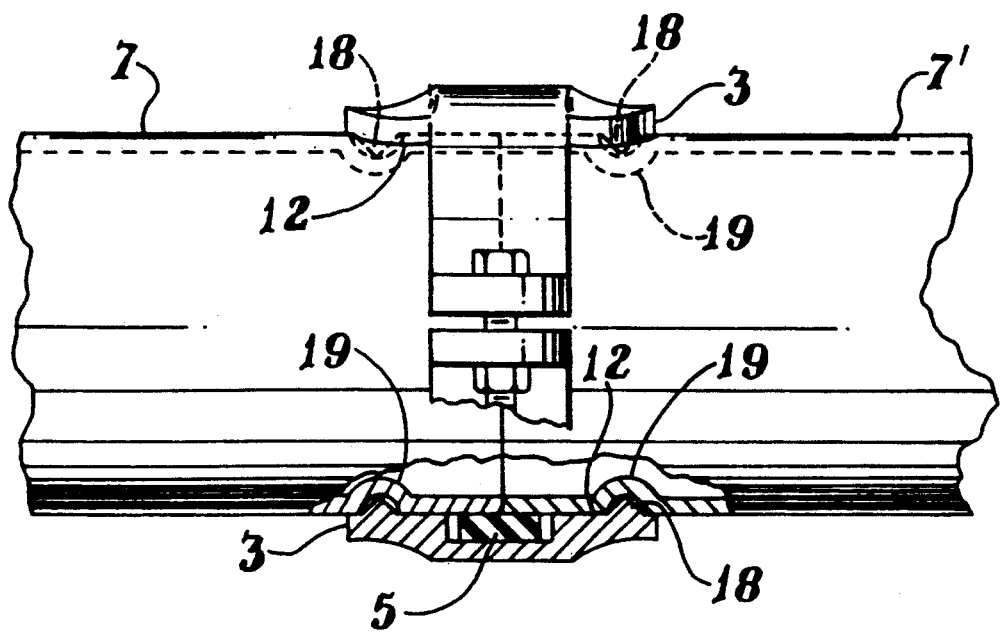
FIG. 8 is a full plan view of a coupling coupled onto adjacent pipe ends wherein there is shown reverse dimples in the pipe and deformation on the coupling segment in place of the slotted lugs.

Also contemplated within the scope of this invention but less desired, is the placement of the metal deformations in the pipe in a manner such that the metal deformation extends into the interior of the pipe. An illustration of this inverted means is shown in FIG. 8. The invention therefore provides for a coupling segment which has points or pins 18 in the lower surface 12 of the radial walls 3, rather than lugs and slots as is illustrated in FIG. 1, 2, and 3, to accomodate the inverted metal deformations 19 in the pipe 7 and 7'. While this does not give a true flow free configuration to the pipe system, it does provide for a practical means of coupling pipe by the metal deformation of the pipe and thus the economies are realized.

Figure 4:
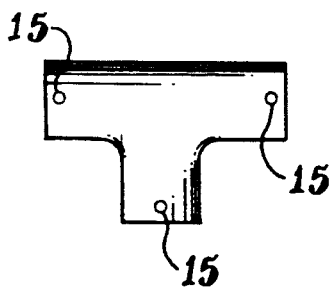
FIG. 4 is a full plan view of a smooth tee fitting of this invention, showing metal dimples in each of the tee end openings.
Figure 5:
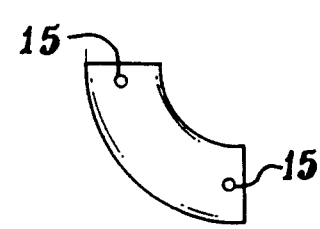
FIG. 5 is a full plan view of a smooth 90° elbow fitting of this invention, showing metal dimples in each of the elbow end openings.
Figure 6:
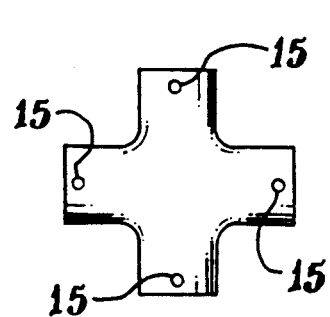
FIG. 6 is a full plan view of smooth crossover fitting of this invention, showing metal dimples in each of the crossover end openings.
Figure 7:
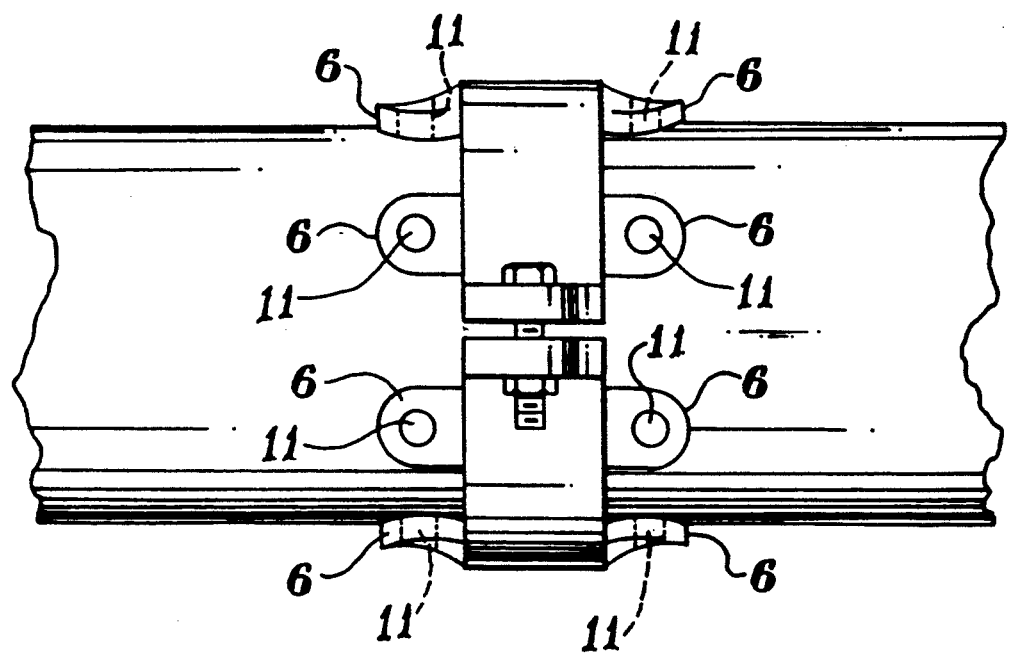
FIG. 7 is a full plan view of a coupling coupled onto adjacent pipe ends wherein there is shown more than two slotted lugs on one coupling segment.

A further advance in the art can be observed with regard to the pipe fitting which can be utilized in the pipe systems of this invention as is illustrated in FIGS. 4, 5, and 6 wherein FIG. 4 is a full plan view of a smooth tee fitting of this invention, showing metal deformations 15 in each of the tee end openings; FIG. 5 is a full plan view of a smooth 90° elbow fitting of this invention, showing metal deformations 15 in each of the elbow end openings, and FIG. 6 is a full plan view of a smooth crossover fitting of this invention, showing metal deformations 15 in each of the crossover end openings. It should be understood by those skilled in the art that the illustrations of FIGS. 4, 5, and do not limit the scope of this invention, as pipe fittings of all configurations can be manufactured with the novel features of this invention, for example elbows having other than a 90° angle as illustrated in FIG. 5, such as 35° and 45° degree angles and welded outlets. Welded outlets are common in the industry and consist of a pipe fitting which is fitted on one end to be placed over a pre-drilled hole in the pipe and and which has a pipe opening on the other end to be coupled to other pipe fittings, or other pipe ends. The welded outlet is placed over the hole with the pipe fitting end outward and the fitted end is welded to the pipe. This then provides a pre-prepared pipe opening to be subsequently coupled to other pipe fittings or other pipe ends. The advance over the art being that the opening of the outlet can be coupled to any other pipe fitting or pipe end which has been pre-prepared.

Also, this invention can accomodate any length of pipe, and it should be recognized by those skilled in the art that short pieces of pipe, ie "stems" or "spools" can be accomodated by this invention as the only limitation on the length of pipe would be a long enough stem or spool to allow the placement of the coupling thereon.

As is shown in each of the said FIGS. 4, 5, and 6, the fittings are smooth and have metal deformations 15 in each of their end openings. Such fittings can be utilized in the pipe systems of this inventions using the novel coupling segments of this invention without the problem of having to provide ridges, grooves, or threads. Thus, any one or a combination of these pipe fittings can be utilized in a pipe system along with smooth pipe in an economical and practical manner.

It should be understood by those skilled in the art that the novel coupling segments 1 have been illustrated as having only one lug 6 per side of the coupling, but it is contemplated that more than one such lug 6 can be formed on the coupling segment and as many such metal deformations 15 can be placed on the pipe ends to accomodate such lugs 6. However, it has been demonstrated by the inventor herein that one such lug 6 per side of the coupling 1 is more than sufficient to give the required strengths to hold the pipe together and provide the stabilization that is required for maintaining a pipe system. More than about two lugs 4 per side would seem to be impractical. A coupling segment is illustrated in FIG. 8, wherein there is shown a full plan view of a coupling coupled onto adjacent pipe ends wherein there is shown more than two slotted lugs 6 on one coupling segment.

Figure 9:
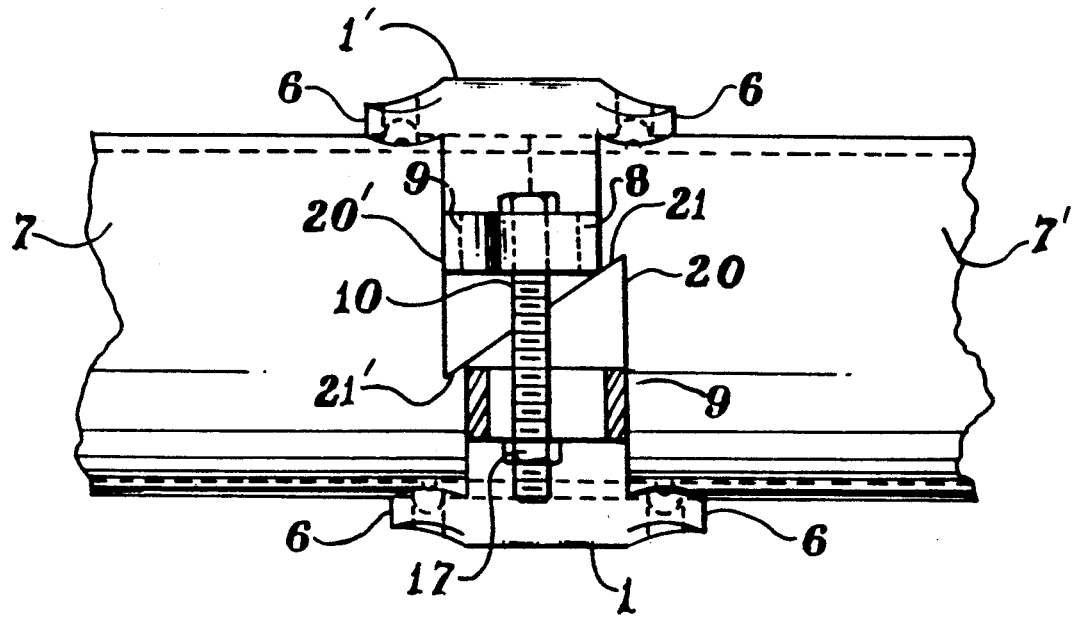
FIG. 9 is a full plan view of a coupling coupled onto adjacent pipe ends wherein the coupling end faces show an angled surface.

Finally, it is contemplated within the scope of this invention to assist the coupling segments of this invention to tighten down on the outer surface of the pipes and apply an enhanced force against the metal deformations 15. For this purpose, there is provided a coupling as illustrated in FIG. 9, wherein the faces of the ends of the individual coupling segments are inclined at an oblique angle to the diametral plane of the coupling, hereinafter defined as the diametral X-Z plane, such that the faces slide relative to each other as the coupling is tightened down to reduce the effective circumferential length of the inner periphery of the coupling and cause the couplings to assert greater force on the metal deformations and the outer surface of the pipes.

Provided for this enhancement is a coupling segment of this invention which has inclined faces on it ends to allow a minor amount of slippage such that one can be assured of enough movement of the lugs 6 about the metal deformations 15 to give a secure clamping of the pipe members.

The end faces of the coupling segments are positioned in closely proximal relationship to each other upon initial assembly of the coupling onto a pipe having an external diameter which is a maximum within a range of manufacturing tolerances. By arranging for the coupling segment faces to be in close proximity to each other, the possibility of gasket extrusion is even further reduced, even in the event that the coupling is applied to a pipe having an external diamter so severely oversized that the end faces cannot meet in face to face engagement. In such an event, an immobilizing clamping force will be applied to the pipes as the coupling is assembled, and the effective width of the gap between the end faces will be materially reduced. The angular relationship of the coupling segment faces modifies the shape of the gap to one which more readily resists extrusion of the gasket.

Various orientation of coupling segment faces are possible, but for purposes of this invention, where inclined coupling segment faces are used, the coupling segment faces should be parallel to the pipe axis. Contemplated within the scope of this invention are orientations wherein the pairs of coupling segment faces are parallel to the axis of the pipe and are generally angled in the opposite or in the same directions. In embodiments which include the opposite angling of the end faces of one of the coupling segments and complementary angled end faces at the ends of the other coupling segment, the respective pairs of end faces will act to urge the end of one of the coupling sgments inwardly to decrease the radius of that coupling segment, while simultaneously urging the ends of the other coupling segment outtwardly to increase the radius of that coupling segment. In this manner, the respective coupling segments flex and permit the respective coupling segment to move into clamping engagement to compensate for an ovesizing, or, undersizing. Where the angling of both end faces of one of the coupling segments is in the same direction and the angling of the other coupling segment is complementarily positioned, lateral displacement of the coupling segment will occur in addition to the flexure of the coupling segment, thus, further assisting the clamping of the coupling onto the pipe ends. This latter configuration is preferred for this invention.

Therefore, in the claims directed to this aspect of the invention, and in this specification, with regard to FIG. 10B, the orientations of the coupling segment faces and the directions in which they are inclined are defined by reference to the respective axes and planes of the coupling which are summarized as follows:

The X axis is an axis related to the end faces of the coupling segments and is an axis extending through the line of generation of the radii of the respective coupling segments. Within minor variations, the X axis includes and passes through the center of the assembled coupling, or provides a bisector of a line extending between the lines of the generation of the radii of the respective coupling segments. For convenience of illustration, the X axis has been illustrated in a horizonatal orientation. It will, however, be appreciated that the X axis may be in any orientation in actual use of the coupling.

The Y axis is an axis extending through the line of generation of the radii of the respective coupling segments, and which is perpendicular to the X axis.

The X-Y plane is a plane including both the X axis and the Y axis, and which thus is perpendicular to the pipe axis.

The Z axis generally corresponds to the pipe axis, and is the longitudinal axis of the coupling which extends through the point of intersection of the X axis and the Y axis, the Z axis thus extending perpendicular to the X-Y plane.

The X-Z plane is a diametral plane which includes both the X axis and the Z axis and the Y-Z plane extends perpendicular to the X-Z plane and includes both the Y axis and the Z axis.

Figure 10A:
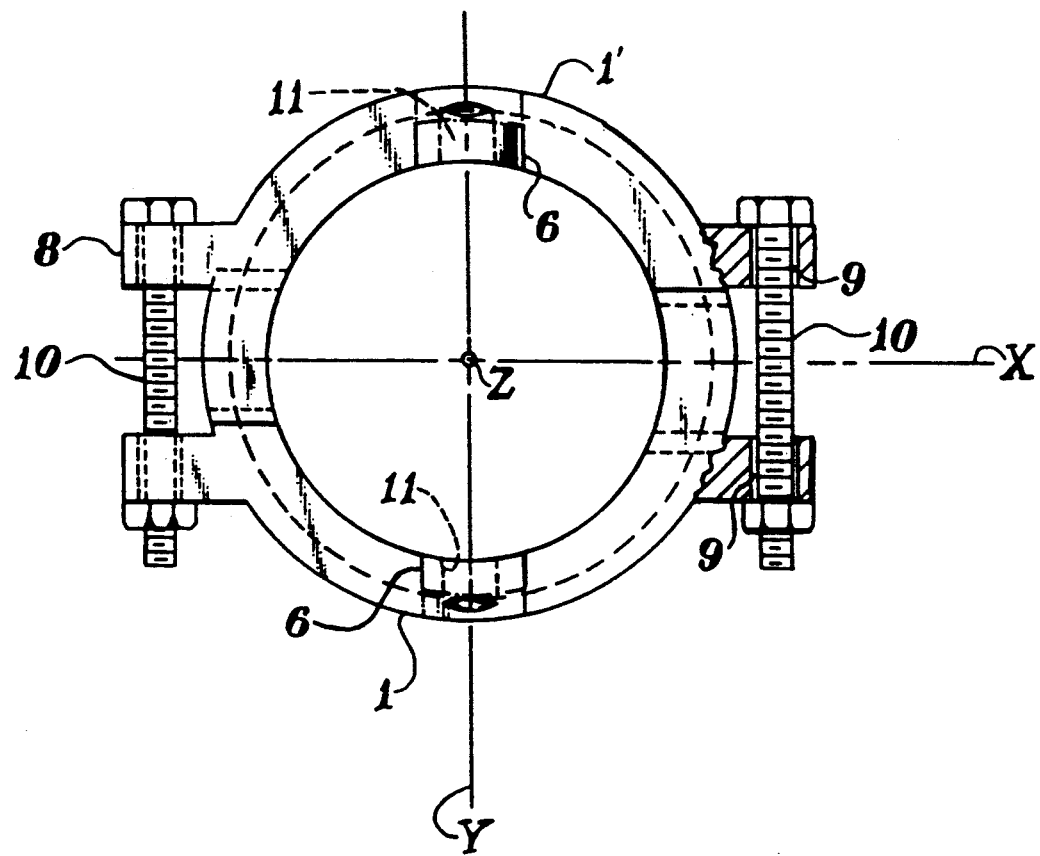
FIG. 10A is an end view of a pipe with the coupling situated on the pipe showing the X, Y, and Z axes.
Figure 10B:
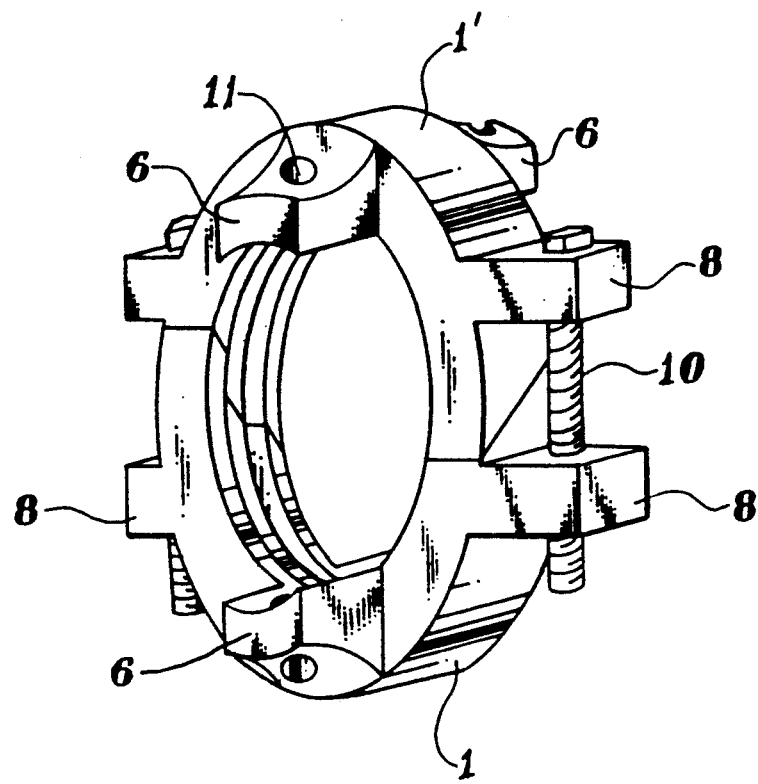
FIG. 10B is a view in perpective of a pipe coupling of the present invention showing the inclined faces of the coupling ends, wherein the inclined faces are angled in opposing directions with regard to each other.
Figure 11:
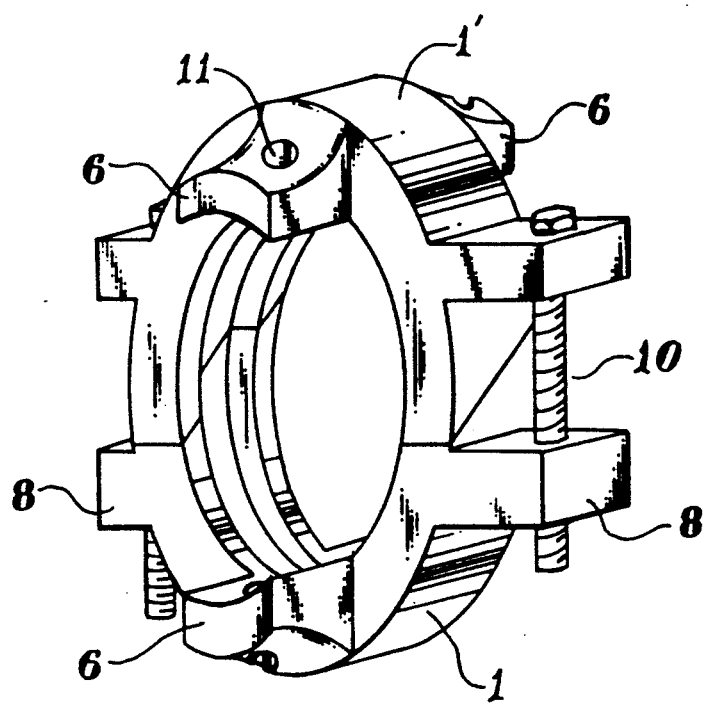
FIG. 11 is a view in perpective of a pipe coupling of the present invention showing the inclined faces of the coupling ends, wherein the inclined faces are angled in the same direction with regard to each other.

The axes are illustrated in FIG. 10A and a coupling having inclined coupling segment faces and assembled on a pipe is shown in FIG. 9.

With regard to FIG. 9, there is shown therein a coupling segment of this invention having coupling segments 20 and 20' with inclined faces 21 and 21' in interfacial contact with each other. The respective pairs of coupling segment faces each extend parallel to the Z axis and are each inclined at opposite oblique angles with respect to the diametral X-Z. For purposes of this invention, the precise angle of inclination is not critical, the objective being to allow the inclined faces of the coupling segments to slip or slide upon one another to create a slight movement in the positioning of the individual coupling segments, and for this purpose, the angles can be on the order of 15° to 60° degrees from the diametral X-Z plane.

Upon assembly of the coupling from two of the coupling segments 1 and 1', using bolts as the fastening means 10, the coupling segment faces 21 and 21' are brought into proximity or into face engagement with each other with the respective coupling segments 1 and 1' enclosing and imprisoning the gasket 5 (not shown). In the event that the pipe members are of diameters falling within the range of tolerances, the respective coupling segment faces 21 and 21' will engage each other in parallelism and in face engagement, and the possibility of extrusion of the gasket at the coupling faces is precluded. The coupling segments 1 and 1' in FIG. 9 are shown in the position they would occupy when the two coupling segments are not aligned with each other and are offset.

It must be recognized by those skilled in the art that these coupling segments require that they be manufactured from metal, such as cast iron, or stainless steel, in order to have the strength to withstand the tremendous pressures that are encountered in connected pipe. It should also be understood by those skilled in the art that there is a large weight savings by the use of these inventive coupling segments.

I claim:

1. A pipe coupling segment for use in joining pipe, said coupling segment comprising an arcuate body comprised of radial and axial walls providing a receptacle for a sealing means wherein each radial wall has an interior surface and an exterior surface and each radial wall of each said arcuate body being radially inwardly extending from the axial wall to provide a support for a projecting lug which is intended for engagement with a metal deformation in the ends of pipe members, said pipe members having a linear axis, said pipe members being arranged in juxtaposed relationship to each other;

each arcuate body terminating in bolt pads at both ends, said bolt pads being used as a means, in combination with a fastening means, for securing said coupling segment with another like coupling segment in an end-to-end encircling relationship about said pipe; each said radial wall having positioned on its center exterior surface, a lug, each said lug having a lower surface and an upper surface, said lug being essentially integrally associated with and a continuation of a portion of the radial side wall projecting along a linear axis of the pipe members, said lower surface being aligned in essentially a pipe conforming configuration with said side; each said lug having slots therethrough which are vertical to said lower surface, said slots being configured to receive metal deformations situated on the respective ends of the pipe members, whereby, as the fastening means of said arcuate bodies are secured and tightened on the bolt pads, the lugs are seated around the segment on the metal deformations to cause the pipe members to be held together.

2. A pipe coupling for joining pipe, said pipe coupling including two arcuate coupling segments in combination with a fastening means;

each said coupling segment comprising an arcuate body comprised of radial and axial walls providing a receptacle for a sealing means wherein each radial wall has an interior surface and an exterior surface and each radial wall of each said arcuate body being radially inwardly extending from the axial wall to provide a support for a projecting lug which is intended for engagement with a metal deformation in the ends of pipe members, said pipe members having a linear axis, said pipe member ends being arranged in juxtaposed relationship to each other;

each arcuate body terminating in bolt pads at both ends, said bolt pads being used as a means, in combination with a fastening means, for securing said coupling segment with another like coupling segment in an end-to-end encircling relationship about said pipe;

each said radial wall having positioned on its center exterior surface, a lug, each said lug having a lower surface and an upper surface, said lug being essentially integrated with and a continuation of a portion of the radial side wall projecting along the linear axis of the pipe members, said lower surface being aligned in essentially a pipe conforming configuration with said side; each said lug having slots therethrough which are vertical to said lower surface and the slots are configured to receive metal deformations situated on the respective ends of the pipe members, whereby, as the fastening means of said arcuate bodies are secured and tightened on the bolt pads, the lugs are seated around the metal projections to cause a drawing down of the coupling segment on the metal deformations to cause the pipe members to be held together.

3. A method of coupling smooth pipe segments at their ends, the method comprising (I) forming a metal deformation on the outside surface of each pipe segment, a predetermined distance from each pipe end, to obtain prepared pipe ends;

(II) axially aligning the prepared pipe ends with each other in close proximity to each other;

(III) applying to the prepared pipe ends a pipe coupling for joining pipe, said pipe coupling including two arcuate coupling segments in combination with a fastening means;

each said coupling segment comprising an arcuate body comprised of radial and axial walls providing a receptacle for a sealing means wherein each radial wall has an interior surface and an exterior surface and each radial wall of each said arcuate body being radially inwardly extending from the axial wall to provide a support for a projecting lug which is intended for engagement with a metal deformation in the ends of pipe members, said pipe members having a linear axis, said pipe member ends being arranged in juxtaposed relationship to each other;

each arcuate body terminating in bolt pads at both ends, said bolt pads being used as a means, in combination with a fastening means, for securing said coupling segment with another like coupling segment in an end-to-end encircling relationship about said pipe;

each said radial wall having positioned on its center exterior surface, a lug, each said lug having a lower surface and an upper surface, said lug being essentially integrated with and a continuation of a portion of the radial side wall projecting along the linear axis of the pipe members, said lower surface being aligned in essentially a pipe conforming configuration with said side; each said lug having slots therethrough which are vertical to said lower surface and the slots are configured to receive metal deformations situated on the respective ends of the pipe members, (IV) tightening the fastening means whereby, as the fastening means of said arcuate bodies are secured and tightened on the bolt pads, the lugs are seated around the metal projections to cause a drawing down of the coupling segment on the metal deformations to cause the pipe members to be held together.

4. A method of coupling together a high pressure smooth pipe system, the method comprising utilizing pipe segments comprising pipe having at least one outwardly extending metal deformation on each end of the pipe segment at a pre-determined distance from each end, and at least one pipe coupling for joining pipe, said pipe coupling including two arcuate coupling segments in combinations with a fastening means;

each said coupling segment comprising an arcuate body comprised of radial and axial walls providing a receptacle for a sealing means wherein each radial wall has an interior surface and an exterior surface and each radial wall of each said arcuate body being radially inwardly extending from the axial wall to provide a support for a projecting lug which is intended for engagement with a metal deformation in the ends of pipe members, said pipe members having a linear axis, said pipe member ends being arranged in juxtaposed relationship to each other;

each arcuate body terminating in bolt pads at both ends, said bolt pads being used as a means, in combination with a fastening means, for securing said coupling segment with another like coupling segment in an end-to-end encircling relationship about said pipe;

each said radial wall having positioned on its center exterior surface, a lug, each said lug having a lower surface and an upper surface, said lug being essentially integrated with and a continuation of a portion of the radial side wall projecting along the linear axis of the pipe members, said lower surface being aligned in essentially a pipe conforming configuration with said side; each said lug having slots therethrough which are vertical to said lower surface and the slots are configured to receive metal deformations situated on the respective ends of the pipe members, whereby, as the fastening means of said arcuate bodies are secured and tightened on the bolt pads, the lugs are seated around the metal projections to cause a drawing down of the coupling segment on the metal deformations to cause the pipe members to be held together.

* * * * *